United States Patent
Ou Yang

(10) Patent No.: US 7,436,739 B2
(45) Date of Patent: Oct. 14, 2008

(54) OPTICAL DISK DRIVE AND CORRECTING METHOD FOR DIFFERENTIAL PUSH-PULL TRACKING ERROR SIGNALS OF THE OPTICAL DISK DRIVE

(75) Inventor: Ko-Hsin Ou Yang, Taipei (TW)

(73) Assignee: Behavior Tech Computer Corp., Sijhih (TW)

( * ) Notice: Subject to any disclaimer, the term of this patent is extended or adjusted under 35 U.S.C. 154(b) by 941 days.

(21) Appl. No.: 10/856,847

(22) Filed: Jun. 1, 2004

(65) Prior Publication Data

US 2006/0203633 A1   Sep. 14, 2006

(51) Int. Cl.
*G11B 7/00* (2006.01)

(52) U.S. Cl. .................................... 369/44.29
(58) Field of Classification Search ........................ None
See application file for complete search history.

(56) References Cited

U.S. PATENT DOCUMENTS

| | | | | |
|---|---|---|---|---|
| 5,251,194 A | * | 10/1993 | Yoshimoto et al. ....... | 369/44.26 |
| 5,926,446 A | * | 7/1999 | Shimizu .................... | 369/44.26 |
| 6,240,054 B1 | * | 5/2001 | Takeya et al. ............. | 369/44.29 |
| 2002/0110057 A1 | * | 8/2002 | Kadlec et al. ............. | 369/44.29 |
| 2003/0026177 A1 | * | 2/2003 | Wu et al. .................. | 369/44.29 |
| 2004/0013056 A1 | * | 1/2004 | Ando ....................... | 369/44.29 |

* cited by examiner

*Primary Examiner*—Joseph Feild
*Assistant Examiner*—Christopher R Lamb
(74) *Attorney, Agent, or Firm*—Rosenberg, Klein & Lee

(57) ABSTRACT

The invention is disclosed a correcting method for differential push-pull(DPP) tracking error signals of an optical disk drive. A Step (A) divides a CD into a plurality of areas according to magnitudes of the peak values of the DPP tracking error signals, wherein the difference between every two DPP peak values of neighboring areas is larger than a predetermined value. A step (B) measures respectively average DPP peak values of every area in the step A for calculating a gain value of each area according to the average DPP peak values and an ideal DPP peak value under a non-track locking state. A step (C) does gain correction for the DPP tracking error signals according to the corresponding gain value of the area accessed when in accessing to an area of the CD.

6 Claims, 6 Drawing Sheets

OPTICAL DISK DRIVE AND CORRECTING METHOD FOR DIFFERENTIAL PUSH-PULL TRACKING ERROR SIGNALS OF THE OPTICAL DISK DRIVE

FIELD OF THE INVENTION

The present invention is related to an optical disk drive and an improving method for signals of the optical disk drive, and especially to an optical disk drive and a correcting method for differential push-pull(DPP) tracking error signals of the optical disk drive.

BACKGROUND OF THE INVENTION

The differential push-pull(DPP) tracking error signals of an optical disk drive mainly are generated by combination of main laser beams and auxiliary laser beams, the content and scope disclosed in prior arts are all related to correction of the gain values between the main laser beams and the auxiliary laser beams, they are concentrated on the content of the technology of the relationship between the main laser beams and the auxiliary laser beams.

In view that the correcting effect on DPP tracking error signals still has defects, the inventor of the present invention tried hard to improve and provided a correcting method and an optical disk drive for performing the correcting method to correct the inferiority of DPP tracking error signals and to correct overly large differences among the DPP tracking error signals to thereby overcome the followings happening in the optical disk drive: (A) inferiority of the inner and outer sides of a CD; (B) a tolerance of assembling of a pick-up; (C) an overly large angle of inclination of an actuator of the pick-up.

SUMMARY OF THE INVENTION

An object of the present invention is to overcome the differences between the DPP tracking error signals of an optical disk drive caused by inconsistent quality of the base layers and the dye layers in the inner and outer sides of different CD's made by various manufacturers.

Another object of the present invention is to overcome the differences between the DPP tracking error signals in the inner and outer sides of an optical disk drive caused by an overly large angle of inclination being due to the tolerance of assembling of a pick-up support of an actuator of the optical disk drive.

Another object of the present invention is to overcome differences among tracking error signals caused by having an angle of inclination in focusing of a pick-up induced by deviation of the an actuator itself.

To achieve the above objects, the present invention provides a correcting method for DPP tracking error signals of an optical disk drive, the method comprises the following steps: (A) to divide a CD into a plurality of areas according to the magnitudes of the peak values of the DPP tracking error signals, wherein the difference between every two DPP peak values of neighboring areas being larger than a predetermined value; (B) under a non-track locking state, to measure the average peak values of DPP tracking error signals respectively of every area in the step A for calculating the gain value of each area according to the average DPP peak values and an ideal DPP peak value; (C) when in accessing to one of the areas of the CD, the optical disk drive proceeding to gain correction for the DPP tracking error signals according to the corresponding gain value of the area accessed, thereby the CD being able to do gain correction for the DPP tracking error signals using the corresponding gain value of each area when the area being accessed, in order that the DPP peak values after accessing being approximately consistent to increase stability of control of tracking.

And more, to achieve the above objects, the present invention provides an optical disk drive having the function of correcting DPP tracking error signals, the optical disk drive comprises: a data signal processor (DSP); a correction module for the DPP tracking error signals executed by the DSP to execute the following commands: (A) to divide a CD into a plurality of areas according to the magnitudes of the peak values of the DPP tracking error signals, wherein the difference between every two DPP peak values of neighboring areas being larger than a predetermined value; (B) under a non-track locking state, to measure the average peak values of DPP tracking error signals respectively of every area in the command A for calculating the gain value of each area according to the average DPP peak values and an ideal DPP peak value; (C) when in accessing to one of the areas of the CD, the optical disk drive proceeding to gain correction for the DPP tracking error signals according to the corresponding gain value of the area accessed, thereby the CD performing gain correction for the DPP tracking error signals using the corresponding gain value of each area when the area being accessed, in order that the DPP peak values after accessing being approximately consistent to increase stability of control of track following.

The present invention will be apparent in the objects, features and functions thereof after reading the detailed description of the preferred embodiment in reference to the accompanying drawings.

DETAILED DESCRIPTION OF THE INVENTION

Figure 1:
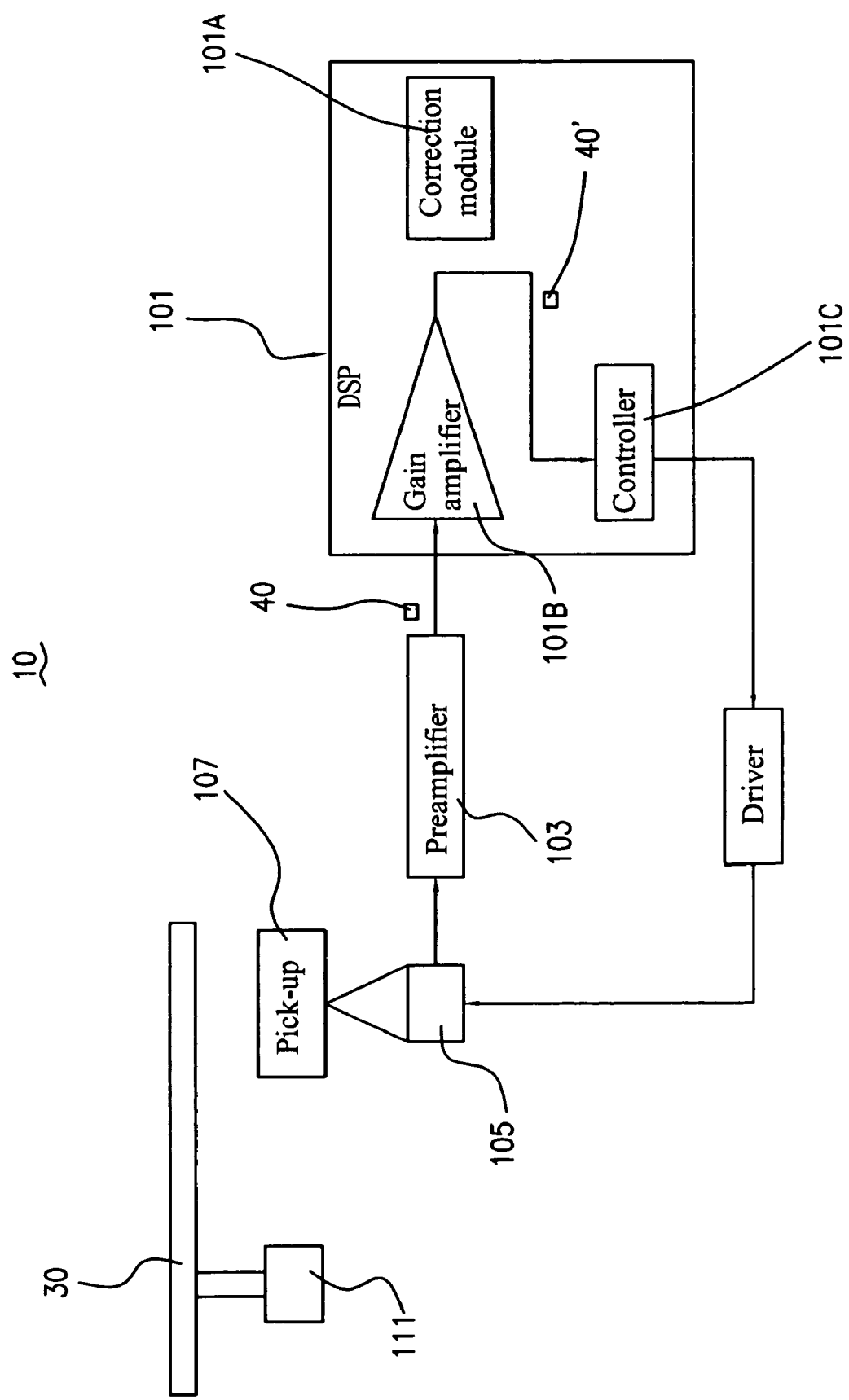
FIG. 1 is a schematic view showing the structure of an optical disk drive using the method of the present invention.
Figure 2:
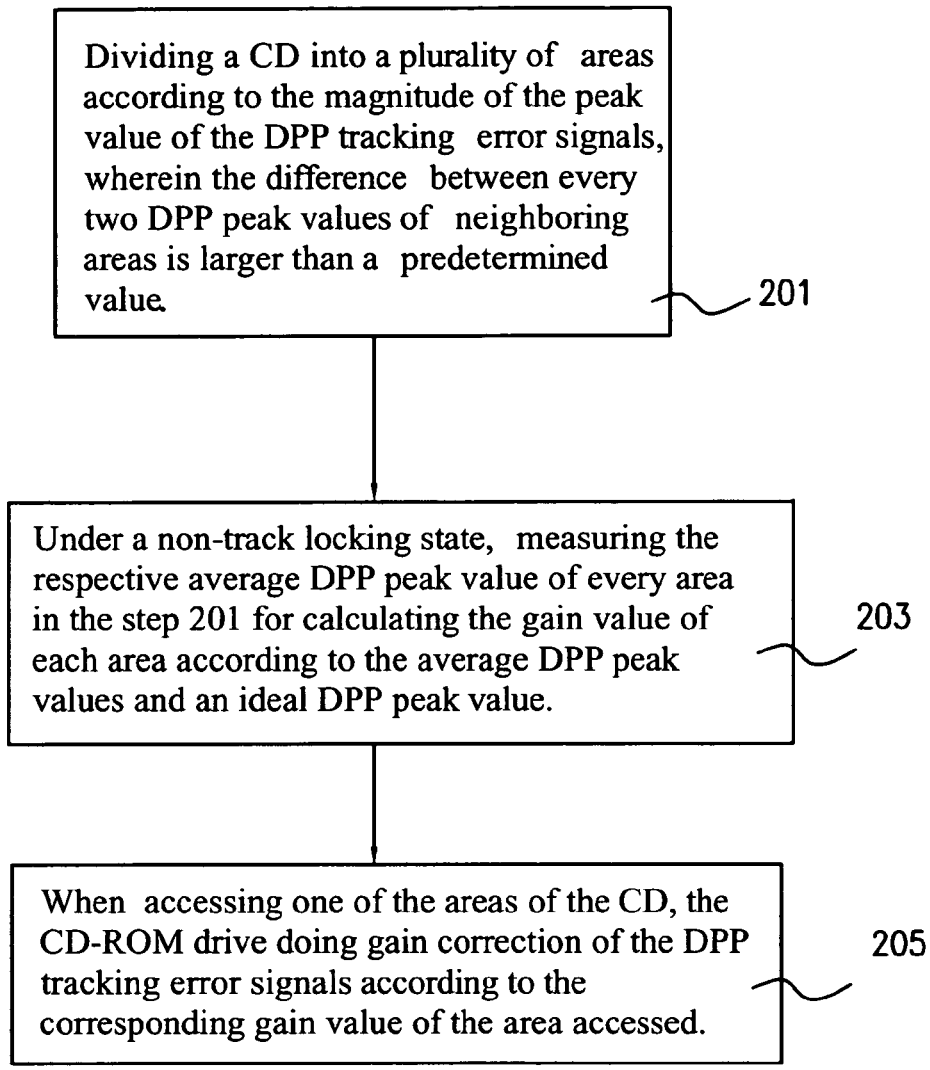
FIG. 2 is a flow chart of the present invention of the correcting method for DPP tracking error signals of the optical disk drive.

FIG. 1 shows a schematic view of the structure of an optical disk drive using a correcting method 20 of the present invention; and FIG. 2 shows a flow chart of the correcting method 20 of the present invention for differential push-pull(DPP) tracking error signals 40 of the optical disk drive. The correcting method 20 used for the DPP tracking error signals 40 of the present invention mainly comprises the following steps.

Figure 3:
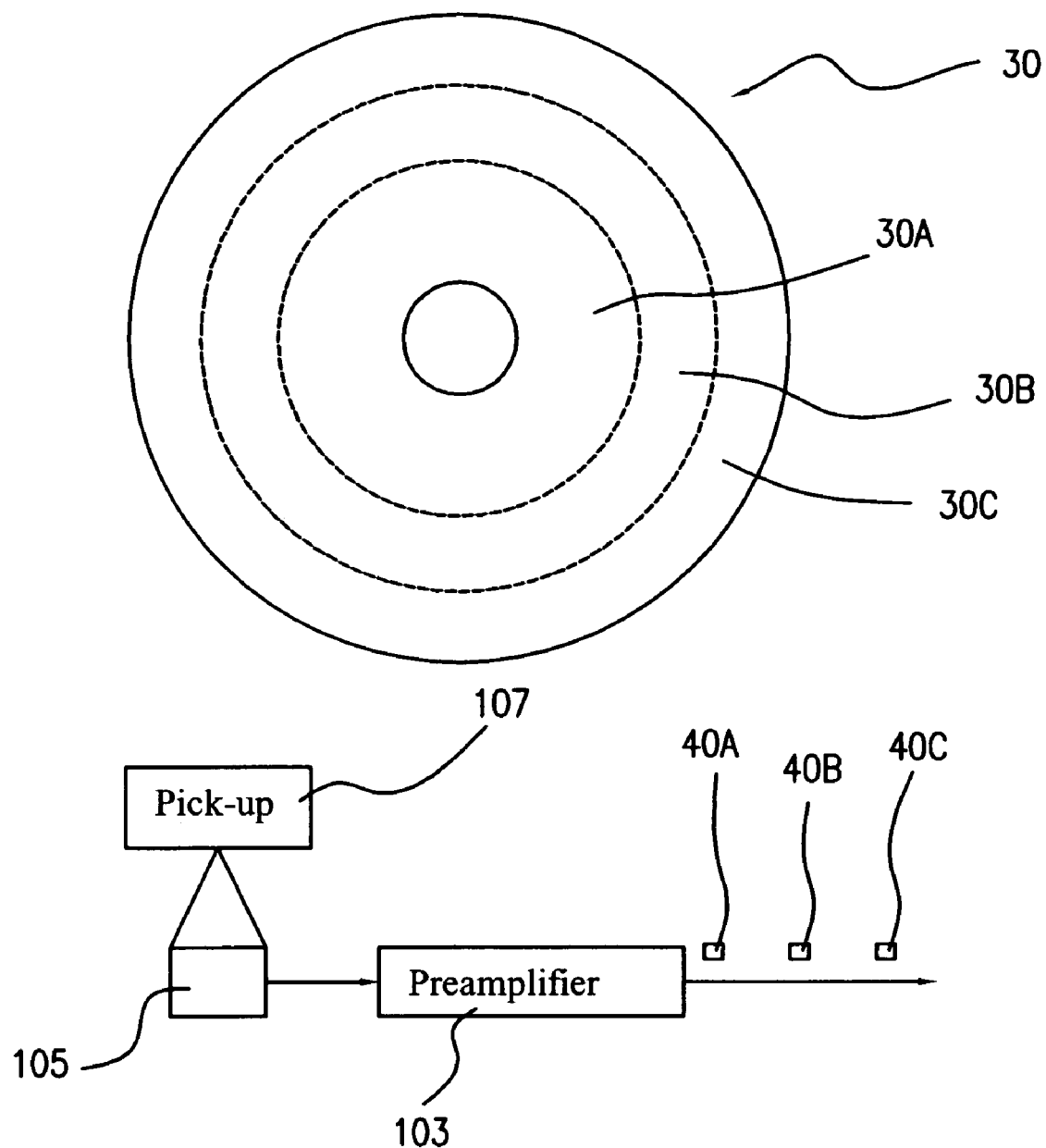
FIG. 3 is a schematic view showing a CD being divided into a plurality of areas according to the method of the present invention.

A step 201 divides a CD 30 into a plurality of areas 30A, 30B, 30C according to the magnitudes of the peak values 40A, 40B, 40C of the DPP tracking error signals, wherein the difference between every two of the peak values 40A, 40B, 40C of the DPP tracking error signals of neighboring ones of the areas 30A, 30B, 30C is larger than a predetermined value. Referring simultaneously to FIG. 3 which is a schematic view showing the CD 30 being divided into a plurality of areas according to the method of the present invention, the CD 30 in FIG. 3 has not yet been processed to make gain correction for the DPP tracking error signals 40 and the difference between every two of the DPP peak values 40A, 40B, 40C of neighboring ones of the areas 30A, 30B, 30C all are larger than a predetermined difference value. Taking a predetermined difference value 150 mV as an example for explanation, the difference between the DPP peak value 40A of the area 30A and the DPP peak value 40B of the area 30B is larger than 150 mV, and the difference between the DPP peak value 40B of the area 30B and the DPP peak value 40C of the area 30C is also larger than 150 mV.

And more, in considering how to practically divide into the areas 30A, 30B, 30C of the CD 30, for example, the CD 30 can be divided in pursuance of the feature thereof, and the scopes of the areas 30A, 30B, 30C can be specified by means of the "minute:second:frame" in a red book. Taking the innermost side (0 minute:2 second:0 frame) of the first area 30A as a starting point, skipping-track detecting is performed every 20 minutes from the starting point toward the outermost side of the CD 30 for measuring the peak values of the DPP tracking error signals. When the DPP peak value 40B is detected to have a difference of a predetermined difference value (e.g. 150 mV) from the former DPP peak value 40A of the area 30A, a position is obtained by skipping track for defining another area 30B. Similarly, according to this DPP peak value 40B of the area 30B, another area 30C can be found to which the difference of the DPP peak value 40C from the DPP peak value 40B is also the predetermined difference value (150 mV). By this practical performance, an example that the CD 30 is divided into three areas now is cited, the first area includes a data area from "0 minute:2 second:0 frame" to "20 minute:59 second:75 frame", and from "0 minute:2 second:0 frame" to "97 minute:0 second:0 frame" as a lead-in area, and the second area includes a data area from "21 minute:0 second:0 frame" to "44 minute:59 second:75 frame", the third area includes a data area from "45 minute:0 second:0 frame" to an ending position of the data area.

A step 203 measures the average DPP peak values respectively of the areas 30A, 30B, 30C, and calculates the gain values of the areas 30A, 30B, 30C according to the average DPP peak values and an ideal DPP peak value. The CD 30 in FIG. 3 is measured respectively on the areas 30A, 30B, 30C. Each of the areas 30A, 30B, 30C at least has one DPP peak value and they are averaged by calculation to obtain the average DPP peak values respectively of the areas 30A, 30B, 30C. In the step 203, the operation of measuring the average DPP peak values is performed under a non-track locking state, and the DPP tracking error signals 40 is converted into a readable value for calculation by using the analog/digital converter of a preamplifier 103. By the fact that at least one DPP peak value is obtained by measuring in each of the areas 30A, 30B, 30C, the difference between every two neighboring ones of the areas 30A, 30B, 30C will not be larger than a predetermined difference value, and all the DPP peak values of the areas 30A, 30B, 30C will present identical peak values of voltage. An ideal DPP peak value generally is a value in a range of figures, for example, an ideal DPP peak value generally is a value of voltage in a range of 1.4V to 1.8V. Those skill in this art can select the best value of voltage within the range of value as the practical ideal DPP peak value. And then, the gain values of the areas 30A, 30B and 30C can be obtained by calculation using the following formula of physics:

the gain value of each of the areas 30A, 30B and 30C=the ideal DPP peak value÷respective one of the average DPP peak values of the areas 30A, 30B, 30C A step 205 does gain correction for the DPP tracking error signals 40 according to the corresponding gain value of each of the areas 30A, 30B, 30C being accessed when in accessing to one of the areas 30A, 30B, 30C of the CD 30, thereby the CD 30 can get gain correction for the DPP tracking error signals 40 using the corresponding gain value of each of the areas 30A, 30B, 30C when the area is accessed, in order that the peak values of the DPP tracking error signals 40 after accessing are approximately consistent. In the step 205, when a data signal processor (DSP) 101 performs accessing to the areas 30A, 30B, 30C of the CD 30, the data signal processor (DSP) 101 sets the corresponding gain value of one of the areas 30A, 30B, 30C to a gain amplifier 101B. By virtue that the input end of the gain amplifier 101B receives the outputted DPP tracking error signals 40 of the preamplifier 103, then the gain amplifier 101B performs gain correction for the inputted DPP tracking error signals 40, the output end of the gain amplifier 101B can output DPP tracking error signals 40' with consistent magnitudes.

By virtue that the DSP 101 processes digital data, the DPP signals can be converted into corresponding digitized DPP signals by using an analog/digital converter, in practice, the analog/digital converter can be an A/D converter of 8 bits.

The correcting method 20 of the present invention is embodied to program codes as a correction module 101A for DPP tracking error signals, the DSP 101 executes the correction module 101A, so that the DPP tracking error signals 40 are all converted into the DPP signals 40' with consistent magnitudes after processing by the correction module 101A for the DPP tracking error signals 40, then the DPP tracking error signals 40' with consistent magnitudes are outputted to a controller 101C. In this way, the problem of differences among the tracking error signals formed in accessing to different areas of the CD 30 as in prior arts can be overcome.

The correcting method 20 of the present invention is embodied to program codes built in an optical disk drive 10, while the optical disk drive 10 of the present invention particularly can be an optical disk drive made by burner or an optical disk drive without the function of burning a CD.

Figure 4:
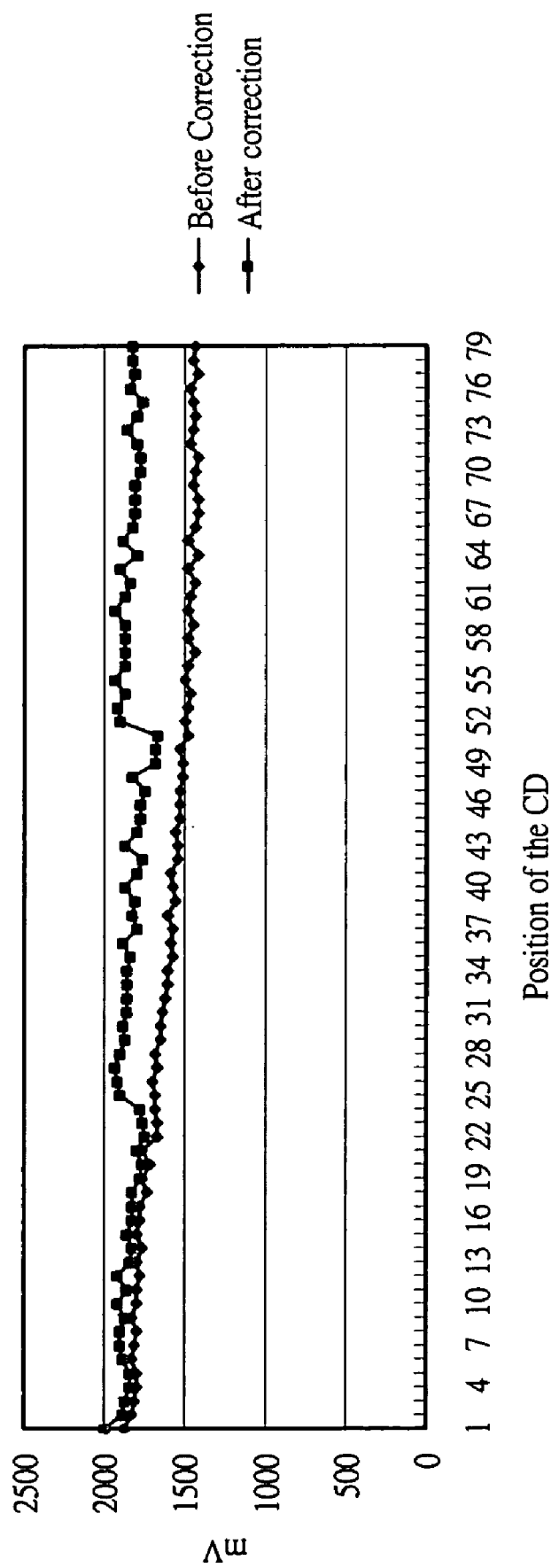
FIGS. 4-6 show the data curves respectively before and after correction of the DPP peak values of signals under a non-track locking state.
Figure 5:
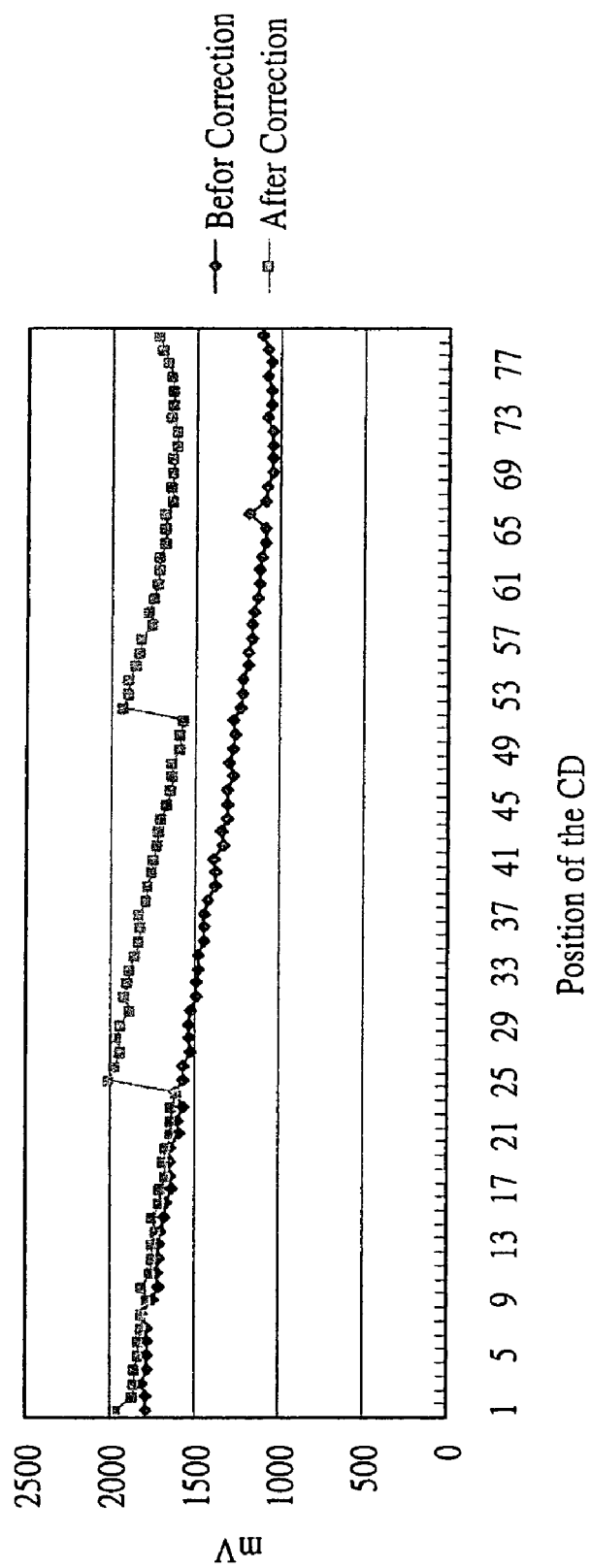
Figure 6:
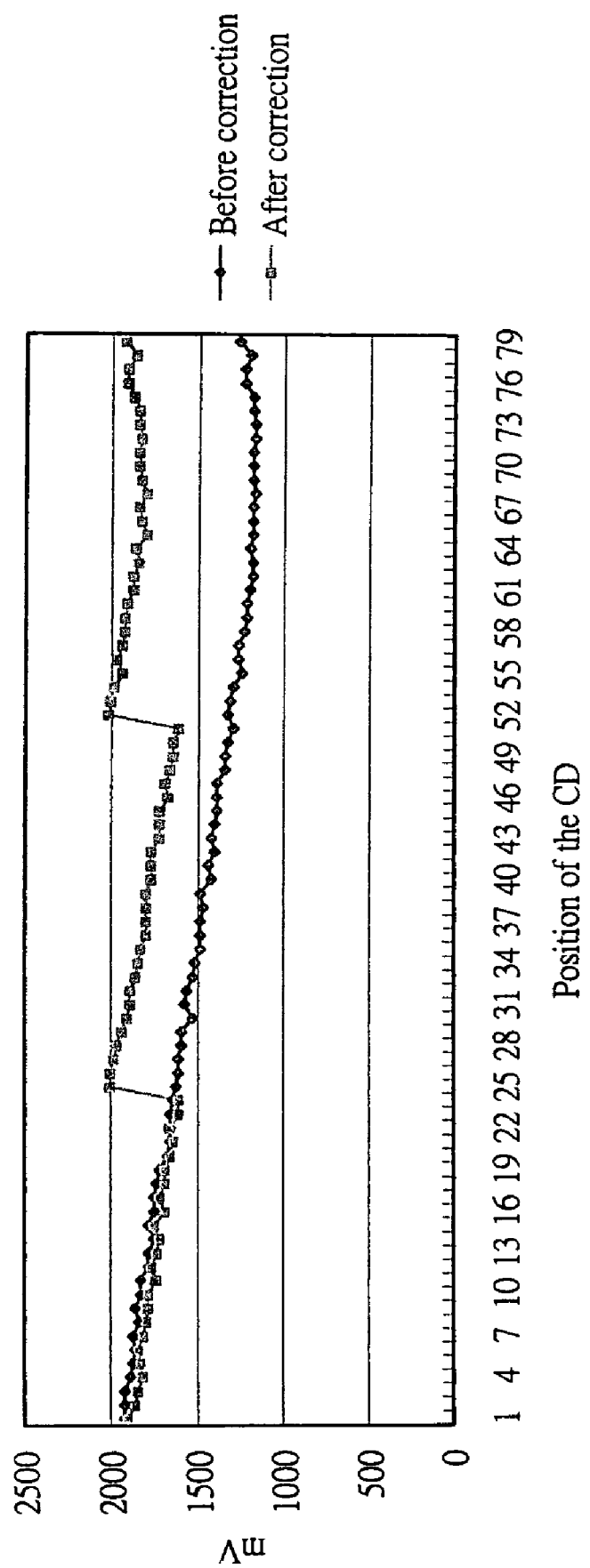

FIGS. 4-6 show the data curves respectively before and after correction of the DPP signals under a non-track locking state. FIGS. 4-6 show performing of gain correction for the DPP peak values of the signals before correction and after correction in practicing the present invention respectively on three different CD's under a non-track locking state, by calculation, each of the DPP peak values of the signals before correction in FIG. 4 has a standard difference of 139.3622 mV, while each of the DPP peak values of the signals after correction in FIG. 4 has a standard difference of only 60.7597 mV. Similarly, by calculation, each of the DPP peak values of the signals before correction in FIG. 5 has a standard difference of 247.3741 mV; while each of the DPP peak values of the signals after correction in FIG. 5 has a standard difference of only 110.239 mV; and by calculation, each of the DPP peak values of the signals before correction in FIG. 6 has a standard difference of 245.505 mV, while each of the DPP peak values of the signals after correction in FIG. 6 has a standard difference of only 105.246 mV. From the values of the corrected DPP signals shown in FIGS. 4-6, we can see that the present invention surely can largely correct the situation of overly large differences of DPP signals in different areas of CD's.

The above stated division of the CD 30 into three areas 30A, 30B, 30C mainly is to express the spirit of the correcting method 20, the present invention is not limited to the number of the division, rather it discloses that the main point is that the difference between every two DPP peak values of neighboring areas is larger than a predetermined value of difference.

The present invention is assured to solve the following problems and thereby has the following advantages:

1. It solves the problem of the differences among tracking error signals because of inferiority of the inner and outer sides made on every CD by manufacturers;
2. It solves the problem of the differences among tracking error signals in the inner and outer sides on every CD because of overly large angle of inclination being due to the tolerance of assembling of a pick-up 107 support of an actuator 105 of the optical disk drive; and
3. It solves the problem of the differences among tracking error signals because of deviation of an actuator 105 of the pick-up 107 resulting the angle of inclination in focusing.

Generally, a fact exists that DPP signals 40 combined from main light beams and fed-back auxiliary laser beams in the inner and outer sides are largely different from one another in their amplitudes of vibration. Moreover, the correcting method 20 and the optical disk drive 10 of the present invention can practically get rid of the following inferiorities induced by the above stated facts:

1. Overly large DPP signals makes easy intruding of impure signals and this can affect the quality of signals;
2. Overly small DPP signals makes insufficient loop gain of the optical disk drive and this renders bad tracking;
3. Number tracks formed from the DPP signals result errors of number tracks by that the DPP signals are too small and this results failure of track leaping over; and
4. Inferior DPP signals of blank CD-R's make overly high rates of errors of tracking and this tends to make failure of CD burning.

The present invention has been described with the preferred embodiments as above. It is only for illustrating the present invention and not for giving any limitation to the scope of the present invention. It will be apparent to those skilled in this art that various modifications or changes made to the present invention without departing from the spirit and the scope of this invention shall also fall within the scope of the appended claims.

What is claimed is:

1. A correcting method for differential push-pull (DPP) tracking error signals of an optical disk drive, said correcting method comprises the following steps:
    (A) Dividing an optical disk into a plurality of areas according to magnitudes of peak values of said DPP tracking error signals, wherein a difference between every two of said DPP peak values of neighboring areas being larger than a predetermined value;
    (B) Under a non-track locking state, measuring average peak values of said DPP peak values respectively of every of said areas in said step A for calculating a gain value of each of said areas according to said average DPP peak values and an ideal DPP peak value; and
    (C) when in accessing to one of said areas of said optical disk, said optical disk drive proceeding to gain correction for said DPP tracking error signals according to a corresponding gain value of said area accessed;
    thereby said optical disk drive performs gain correction for said DPP tracking error signals using said corresponding gain value of each of said areas when said area being accessed, in order that said DPP peak values after accessing being approximately consistent to increase stability of control of tracking.

2. The correcting method as in claim 1, wherein the calculating step of said step B using the following formula: said gain value of each of said areas=said ideal DPP peak value/respective one of said average DPP peak values of said areas.

3. The correcting method as in claim 1, wherein said steps (A) through (C) are executed by a data signal processor (DSP) in said optical disk drive.

4. An optical disk drive having a function of correcting push-pull (DPP) tracking error signals, said optical disk drive comprises:
    a data signal processor (DSP);
    a correction module for correcting DPP tracking error signals executed by said DSP to execute the following commands:
    (A) dividing an optical disk into a plurality of areas according to magnitudes of peak values of said DPP tracking error signals, wherein a difference between every two of said DPP peak values of neighboring areas is larger than a predetermined value;
    (B) under a non-track locking state, measuring respectively average DPP peak values of every of said areas in said command A for calculating a gain value of each of said areas according to said average DPP peak values and an ideal DPP peak value; and
    (C) when in accessing to one of said areas of said optical disk, said optical disk drive proceeding to gain correction for said DPP tracking error signals according to a corresponding gain value of said area accessed;
    thereby said optical disk drive performs gain correction for said DPP tracking error signals using said corresponding gain value of each of said areas when said area being accessed, in order that said DPP peak values after accessing being approximately consistent to increase stability of control of tracking.

5. The optical disk drive as in claim 4, wherein said gain value of each of said areas=said ideal DPP peak value/respective one of said average DPP peak values of said areas.

6. The optical disk drive as in claim 4, wherein said correction module for said DPP tracking error signals is program codes.

* * * * *